United States Patent
Tsuruha et al.

(10) Patent No.: US 10,566,862 B2
(45) Date of Patent: Feb. 18, 2020

(54) ROTOR, ROTARY ELECTRIC MACHINE, AND METHOD OF PRODUCING ROTOR

(71) Applicant: Mitsubishi Electric Corporation, Tokyo (JP)

(72) Inventors: Jun Tsuruha, Tokyo (JP); Ryo Nabika, Tokyo (JP); Hiroshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/759,539

(22) PCT Filed: Nov. 13, 2015

(86) PCT No.: PCT/JP2015/082026
§ 371 (c)(1),
(2) Date: Mar. 13, 2018

(87) PCT Pub. No.: WO2017/081822
PCT Pub. Date: May 18, 2017

(65) Prior Publication Data
US 2019/0089213 A1    Mar. 21, 2019

(51) Int. Cl.
*H02K 1/27* (2006.01)
*H02K 1/28* (2006.01)
*H02K 11/215* (2016.01)
(Continued)

(52) U.S. Cl.
CPC .............. *H02K 1/276* (2013.01); *H02K 1/28* (2013.01); *H02K 1/30* (2013.01); *H02K 11/215* (2016.01);
(Continued)

(58) Field of Classification Search
CPC ...... H02K 11/215; H02K 15/03; H02K 15/12; H02K 1/276; H02K 1/28
(Continued)

(56) References Cited

U.S. PATENT DOCUMENTS 7,551,051 B2 * 6/2009 Ugai .................. H01F 41/0253
148/101
2005/0218861 A1    10/2005  Kimura et al.
(Continued)

FOREIGN PATENT DOCUMENTS

JP    02174543 A    7/1990
JP    07115761 A    5/1995
(Continued)

OTHER PUBLICATIONS

International Search Report dated Feb. 16, 2016 issued in corresponding international patent application No. PCT/JP2015/082026.

*Primary Examiner* — Alex W Mok
(74) *Attorney, Agent, or Firm* — Posz Law Group, PLC

(57) ABSTRACT

A rotor, a rotary electric machine, and a rotor production method that reduce parts count, allow easy fixing, and prevent displacement. The rotor includes a rotor core having a cylindrical shape and a plurality of insertion holes, and a sensor magnet having an annular shape and placed coaxially with the rotor core, in which the sensor magnet has a plurality of protrusions protruding toward the rotor core, the plurality of protrusions are inserted into the plurality of insertion holes, and the rotor core and the sensor magnet are firmly fixed to each other by resin.

6 Claims, 7 Drawing Sheets

(51) Int. Cl.
*H02K 15/03* (2006.01)
*H02K 15/12* (2006.01)
*H02K 29/08* (2006.01)
*H02K 1/30* (2006.01)

(52) U.S. Cl.
CPC ............ *H02K 15/03* (2013.01); *H02K 15/12* (2013.01); *H02K 29/08* (2013.01)

(58) Field of Classification Search
USPC .................................................. 310/156.05
See application file for complete search history.

(56) References Cited

U.S. PATENT DOCUMENTS

| | | | |
|---|---|---|---|
| 2007/0145839 A1 | 6/2007 | Kimura et al. | |
| 2009/0108686 A1* | 4/2009 | Jeung ................ | H02K 1/2733 310/51 |
| 2010/0033050 A1* | 2/2010 | Kobayashi ............ | H02K 29/12 310/156.12 |
| 2012/0112588 A1 | 5/2012 | Watanabe et al. | |
| 2013/0020916 A1* | 1/2013 | Kim ...................... | H02K 29/08 310/68 B |
| 2013/0285482 A1* | 10/2013 | Yamamoto ............ | H02K 1/278 310/43 |
| 2013/0293036 A1* | 11/2013 | Yamamoto ............ | H02K 1/276 310/43 |
| 2014/0167532 A1* | 6/2014 | Park ..................... | H02K 1/2733 310/45 |

FOREIGN PATENT DOCUMENTS

| | | | | |
|---|---|---|---|---|
| JP | 11113200 A | * | 4/1999 | ............ H02K 1/185 |
| JP | 11289736 A | | 10/1999 | |
| JP | 2005-295673 A | | 10/2005 | |
| JP | 1957874 B2 | | 6/2012 | |

* cited by examiner

ROTOR, ROTARY ELECTRIC MACHINE, AND METHOD OF PRODUCING ROTOR

CROSS REFERENCE TO RELATED APPLICATION

This application is a U.S. national stage application of PCT/JP2015/082026 filed on Nov. 13, 2015, the contents of which are incorporated herein by reference.

TECHNICAL FIELD

The present invention relates to a rotor of a rotary electric machine, the rotary electric machine, and a method of producing the rotor, and more particularly, to a structure for fixing a sensor magnet.

BACKGROUND ART

Among rotary electric machines, attention is being given to a rotary electric machine that includes an interior permanent magnet rotor, in which a magnet is embedded, and achieves high torque at high efficiency. In the following description, the interior permanent magnet rotor will be referred to as an IPM rotor, as IPM stands for Interior Permanent Magnet. The IPM rotor may sometimes be equipped with a sensor magnet for use to detect rotational position of the rotor in addition to a main magnet for rotation.

Patent Literature 1 discloses a technique whereby a sensor magnet is held between two bosses and fixed to a rotor shaft on which the sensor magnet is mounted. Also, Patent Literature 2 discloses a technique for mounting a mounting portion D-shaped in cross section and provided with an elastic piece to a sensor magnet and mounting the sensor magnet to a rotor shaft provided with a mounting portion D-shaped in cross section. The sensor magnet is fixed by a restoring force generated on the elastic piece attached to the mounting portion of the sensor magnet.

CITATION LIST

Patent Literature

Patent Literature 1: Japanese Unexamined Patent Application Publication No. 7-115761
Patent Literature 2: Japanese Unexamined Patent Application Publication No. 11-289736

SUMMARY OF INVENTION

Technical Problem

With the method of Patent Literature 1, to prevent the sensor magnet from falling off the shaft, the two bosses holding the sensor magnet between the two bosses must be mechanically tightened, thus making it difficult to fix the sensor magnet sufficiently while breakage of the sensor magnet is avoided. Also, with the method of Patent Literature 2, it is necessary to mount at least two parts, i.e., the mounting portion on the side of the sensor magnet and the mounting portion on the side of the shaft, thus resulting in increased man-hours required to mount the sensor magnet as well as an increased parts count.

Furthermore, regardless of whichever methods described in Patent Literature 1 and Patent Literature 2 may be adopted, it is difficult to accurately position and mount the components as the sensor magnet and other components are placed individually during mounting. If the sensor magnet is displaced from the shaft or the rotor, creating a gap due to low positioning accuracy during mounting, the motor will wobble during operation, causing noise or breakage.

The present invention has been developed to solve the above problems and has an object to provide a rotor that is capable of reducing the number of parts needed for mounting, easy to mount, and capable of preventing displacement between a sensor magnet and the rotor as well as to provide a rotary electric machine and a method of producing the rotor.

Solution to Problem

A rotor according to an embodiment of the present invention includes a rotor core having a cylindrical shape and a plurality of insertion holes, and a sensor magnet having an annular shape and placed coaxially with the rotor core, in which the sensor magnet has a plurality of protrusions protruding toward the rotor core, the plurality of protrusions are inserted into the plurality of insertion holes, and the rotor core and the sensor magnet are firmly fixed to each other by resin.

Advantageous Effects of Invention

In the rotor according to an embodiment of the present invention, the protrusions of the sensor magnet are inserted into the insertion holes in the rotor core and the rotor core and the sensor magnet are integrated with each other by being firmly fixed to each other by resin. Consequently, the rotor core and the sensor magnet are fixed easily without the need for separate parts in fixing the two components, and moreover, fixing the rotor core and the sensor magnet by resin can prevent displacement.

DESCRIPTION OF EMBODIMENT

Embodiment

A rotor according to an embodiment of the present invention is called an IPM rotor that includes an interior permanent magnet rotor core in which a magnet is embedded, and a sensor magnet fixed to the rotor core and configured to detect rotational position of the rotor core. The rotor constitutes a rotary electric machine in conjunction with a stator and a rotor shaft on which the rotor is mounted. Note that IPM stands for Interior Permanent Magnet.

Figure 1:
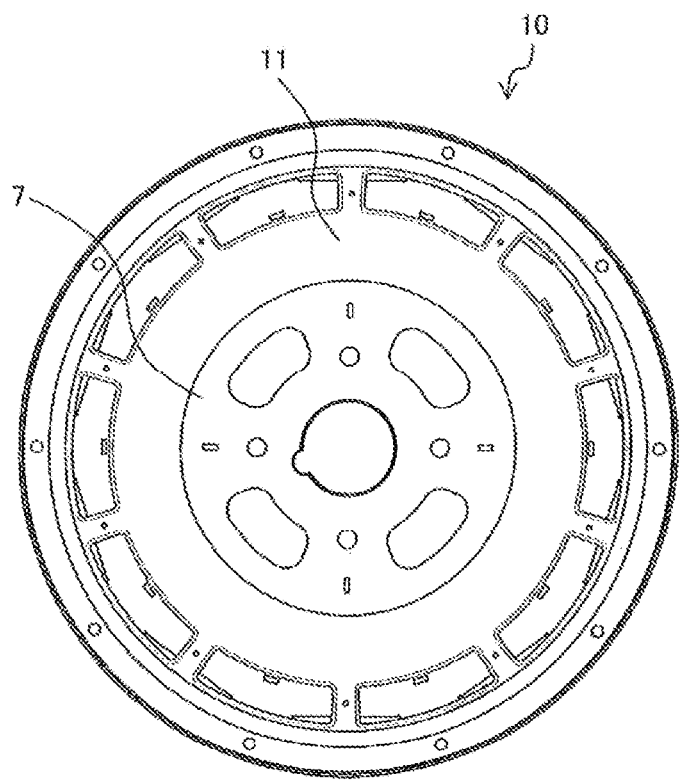
FIG. 1 is a top view of a rotor according to an embodiment.
Figure 2:
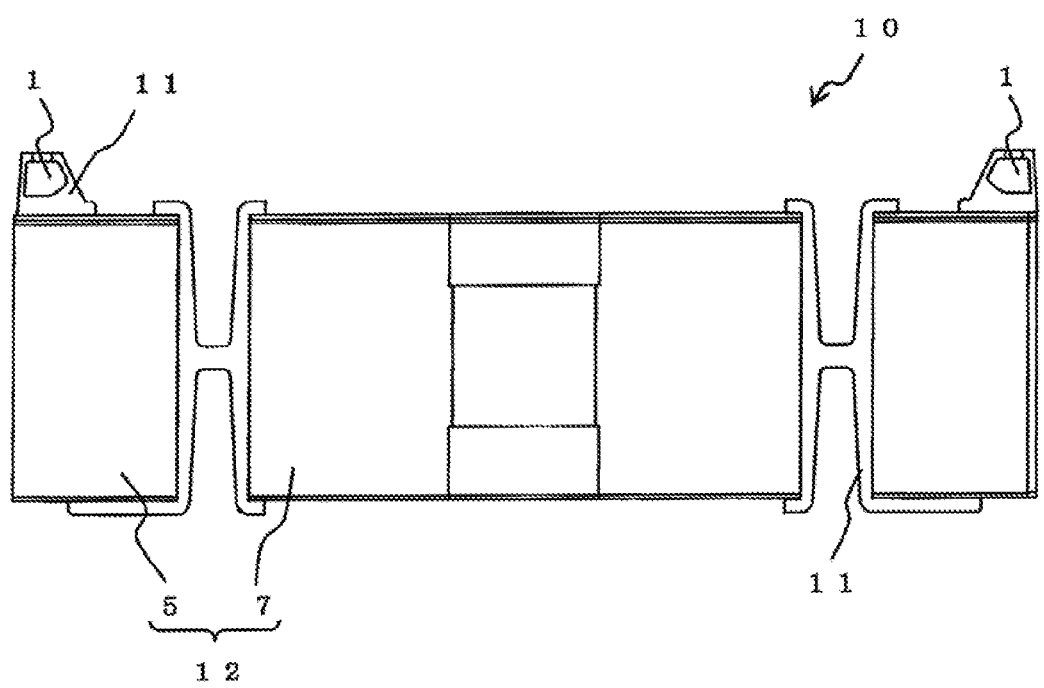
FIG. 2 is an explanatory diagram schematically showing an internal structure of the rotor of FIG. 1.

FIG. 1 is a top view of the rotor 10 according to the present embodiment and FIG. 2 is an explanatory diagram schematically showing an internal structure of the rotor 10 of FIG. 1. As shown in FIG. 2, the rotor 10 includes a rotor core 12 and a sensor magnet 1. The rotor core 12 is consisted of an outer ring 5, an inner ring 7, and a non-illustrated main magnet, and the sensor magnet 1 is firmly fixed to the rotor core 12 coaxially with the rotor core 12 and configured to detect rotational position of the rotor core 12. The rotor core 12 and the sensor magnet 1 are firmly fixed to each other integrally by resin 11.

Figure 3:
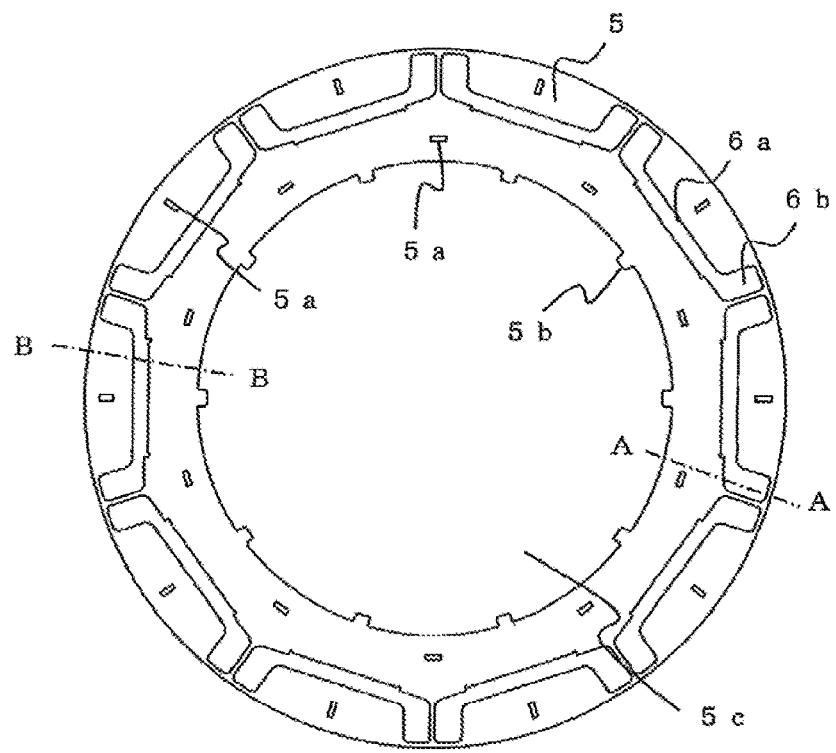
FIG. 3 is a top view of an outer ring constituting a rotor core of FIG. 1.
Figure 4:
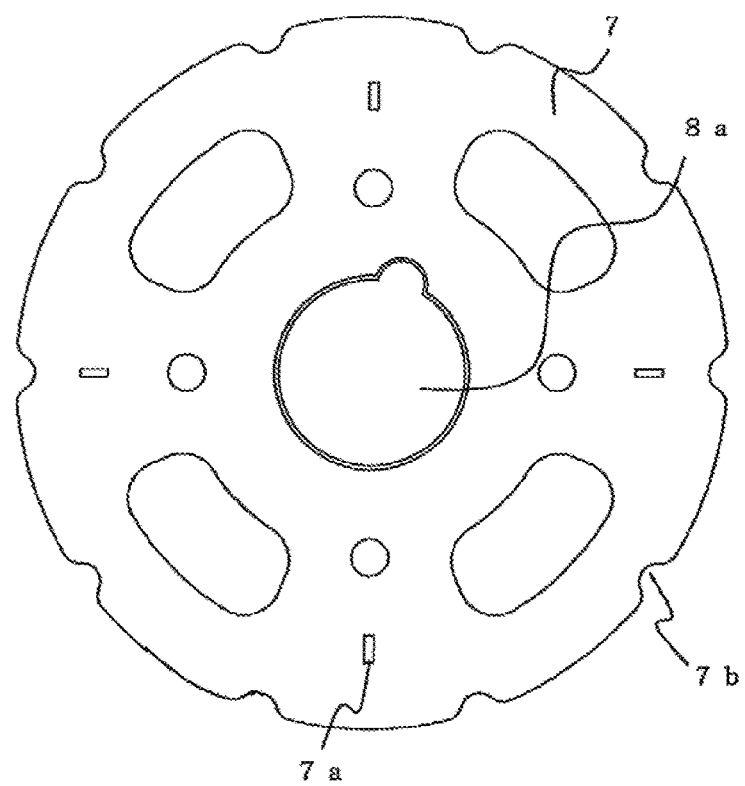
FIG. 4 is a top view of an inner ring constituting the rotor core of FIG. 1.
Figure 5:
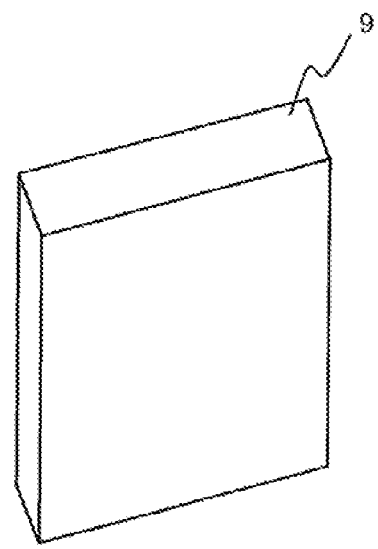
FIG. 5 is a perspective view of a main magnet housed in the outer ring.

FIG. 3 is a top view of the outer ring 5 constituting the rotor core 12 of FIG. 1, FIG. 4 is a top view of the inner ring 7 constituting the rotor core 12 of FIG. 1, and FIG. 5 is a perspective view of a main magnet 9 housed in the outer ring 5. As shown in FIGS. 3 and 4, the outer ring 5 and the inner ring 7 are annular in top view, and materials such as a magnetic steel sheet, for example, are used. Also, the main magnet 9 is formed into a flat-plate shape. The rotor core 12 is formed by stacking the outer rings 5 and the inner rings 7 made of the sheet metals shaped as shown in FIGS. 3 and 4, to a predetermined thickness. Concavo-convex portions 5a and 7a are formed on the outer rings 5 and the inner rings 7 made of sheet metal, to prevent scattering of the outer rings 5 and scattering of the inner rings 7, which are stacked by caulking the concavo-convex portions 5a and 7a. Also, engaging portions 5b and 7b formed on the outer rings 5 and the inner rings 7 are engaged with each other to prevent the outer rings 5 and the inner rings 7 from being displaced from each other by the action of rotary torque.

On a top face of the outer ring 5, plural main magnet insertion holes 6a are formed along a circumferential direction of the outer ring 5. The main magnet insertion holes 6a are holes into which the main magnets 9 are inserted. At both ends of each main magnet insertion hole 6a, sensor magnet insertion holes 6b into which protrusions of the sensor magnet 1 are inserted, are formed. Note that the sensor magnet insertion holes 6b correspond to insertion holes of the present invention. A circular space 5c in which the inner ring 7 is placed is formed in a center of the outer ring 5. A shaft insertion hole 8a into which the shaft is inserted is provided in a center of the inner ring. The rotor core 12 is consisted of the outer ring 5, the main magnet 9 placed on the top face of the outer ring 5, and the inner ring 7 placed in the center of the outer ring 5. By constructing the rotor core 12 from separate parts, i.e., the outer ring 5 and the inner ring 7, electrolytic corrosion of the rotor 10 is inhibited.

Figure 6:
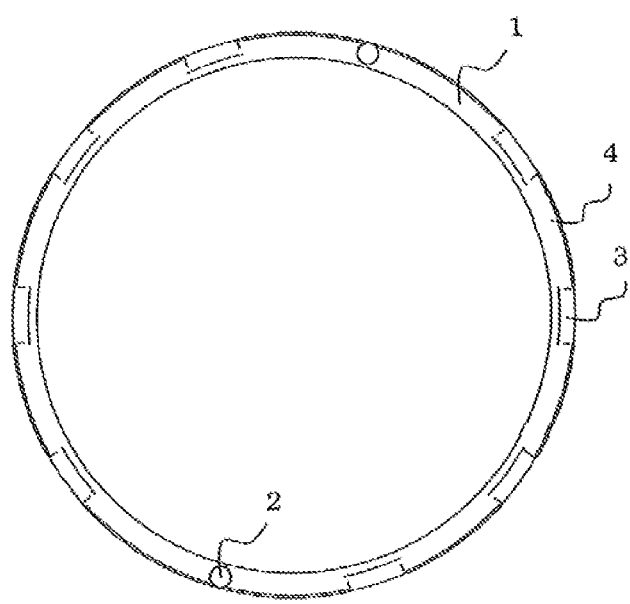
FIG. 6 is a top view of a sensor magnet constituting the rotor of FIG. 1.
Figure 7:
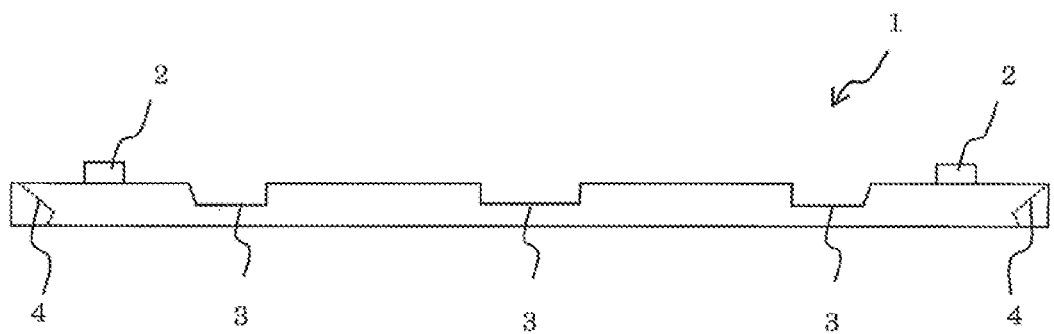
FIG. 7 is a side view of the sensor magnet of FIG. 6.

FIG. 6 is a top view of the sensor magnet 1 constituting the rotor 10 of FIG. 1. FIG. 7 is a side view of the sensor magnet 1 of FIG. 6. As shown in FIGS. 6 and 7, the sensor magnet 1 has an annular shape, plural pins 2 protruding upward and plural cuts 3 depressed downward are formed on one side of the surface, and an annular inner edge portion of the sensor magnet 1 is a tapered portion 4. The sensor magnet 1 is placed such that the surface on which the pins 2 are formed faces a top face of the rotor core 12. The pins 2 are columnar portions protruding from the sensor magnet 1. Note that the pins 2 are an example of the protrusions of the present invention. The cuts 3 are provided to improve fluidity of the resin 11 when the rotor core 12 and the sensor magnet 1 are fixed firmly. The sectional view of the rotor 10 in FIG. 2 shows that region of the sensor magnet 1 in which the cut 3 is formed. The tapered portion 4 is a region formed in the inner edge portion of the sensor magnet 1 such that the inside diameter of the tapered portion 4 is reduced from the surface on which the pins 2 are provided to the other surface toward the direction facing the rotor core 12.

Figure 8:
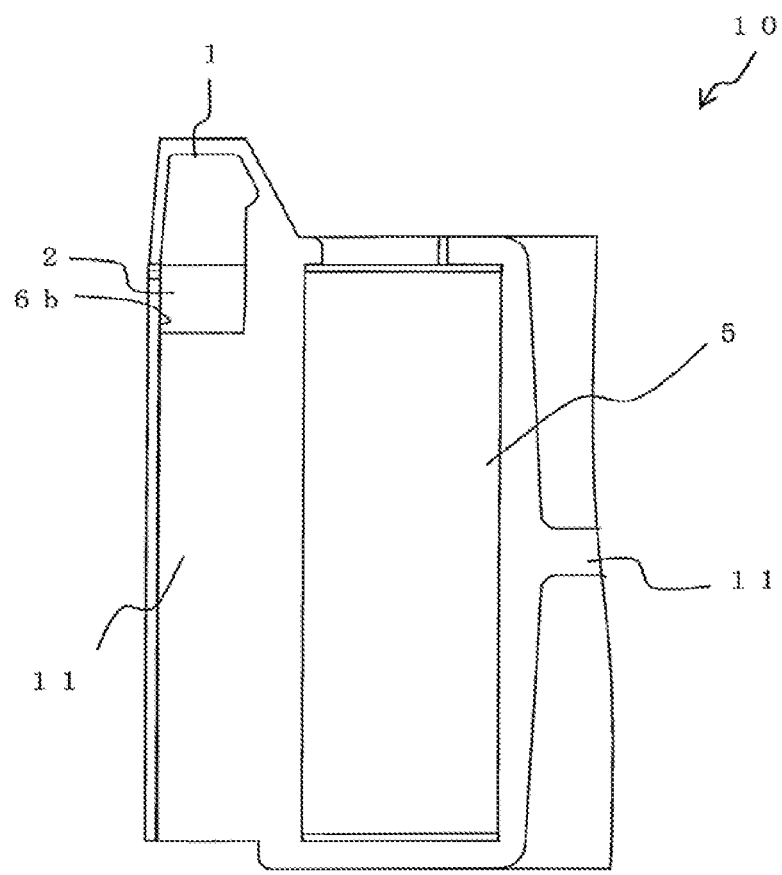
FIG. 8 is a diagram describing a joint portion between the rotor and a pin along line A-A in FIG. 3.

FIG. 8 is a diagram describing a joint portion between the rotor 10 and the pin 2 along line A-A in FIG. 3. As shown in FIG. 8, the pin 2 of the sensor magnet 1 is inserted into the sensor magnet insertion hole 6b formed in the outer ring 5 of the rotor 10. A mounting position of the sensor magnet 1 on the rotor core 12 is ensured by the pins 2.

Figure 9:
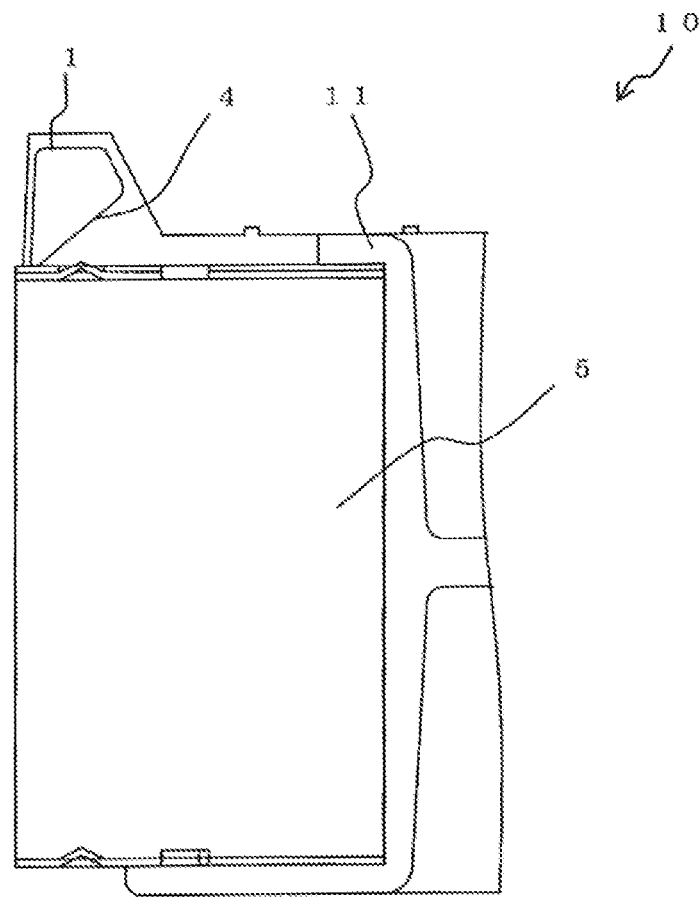
FIG. 9 is a diagram describing a joint portion between the rotor and a tapered portion along line B-B in FIG. 3.

FIG. 9 is a diagram describing a joint portion between the rotor 10 and the tapered portion 4 along line B-B in FIG. 3. As shown in FIG. 9, the rotor 10 and the sensor magnet 1 are joined together such that the tapered portion 4 of the sensor magnet 1 faces the rotor 10. As the tapered portion 4 is formed toward a direction in which the tapered portion 4 faces the rotor core 12, the tapered portion 4 is pushed up in a direction away from the rotor core 12 by the resin 11 between the sensor magnet 1 and the rotor core 12.

Figure 12:
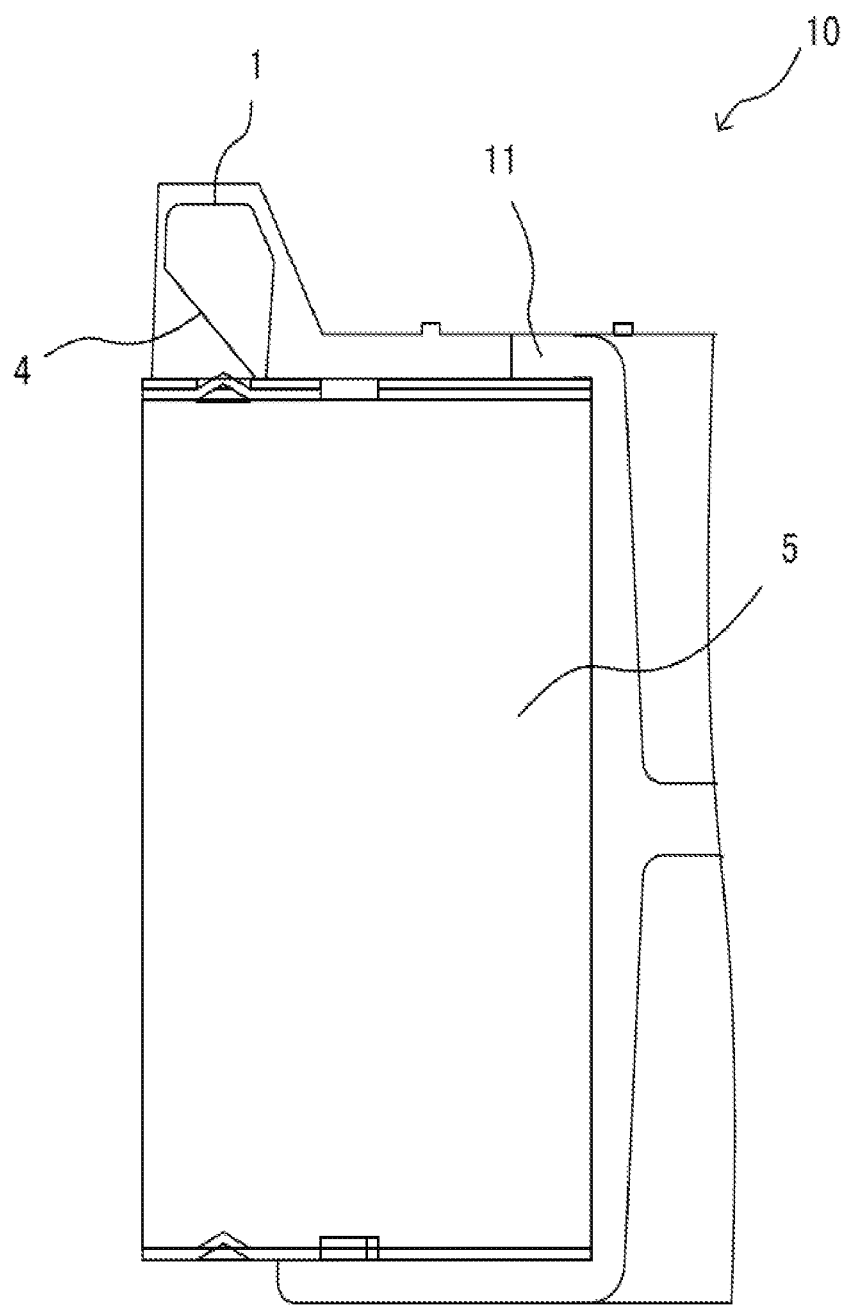
FIG. 12 is a diagram of another tapered portion.

The shape of the pins 2 formed on the sensor magnet 1 is not limited to a columnar shape, and may be a circular cone shape, triangular prism shape, or other shape, and there may be two or more pins. Also, the location and the number of cuts 3 formed in the sensor magnet 1 are not limited. Furthermore, FIG. 12 shows a tapered portion, in which the tapered portion 4 may be provided in an outer edge portion of the surface on which the pins 2 are provided instead of being provided in the inner edge portion of the sensor magnet 1, such that the inside diameter of the tapered portion 4 is enlarged from the surface on which the pins 2 are provided to the other surface toward the direction in which the tapered portion 4 faces the rotor core 12.

The rotor core 12 and the sensor magnet 1 on the top face of the rotor core 12 are firmly fixed to each other by the resin 11 interposed between the rotor core 12 and the sensor magnet 1 and thereby constitute the rotor 10. Note that a thermoplastic polybutylene terephthalate resin or a thermosetting unsaturated polyester resin may be used as the resin 11.

Next, a method of producing the rotor 10 according to the present embodiment will be described. First, a single-piece mold is prepared, and the outer ring 5 and the inner ring 7 are placed in the single-piece mold. Then, the main magnet 9 is inserted into each of the main magnet insertion holes 6a of the outer ring 5. Then, the sensor magnet insertion holes 6b of the outer ring 5 and the pins 2 of the sensor magnet 1 are oriented to face each other and the sensor magnet 1 is put on the top face of the outer ring 5 while the pins 2 are inserted into the sensor magnet insertion holes 6b. Then, the mold is closed and filled with the resin 11.

The resin 11 filled into the mold deposits slowly from a bottom of the mold, flows through the cuts 3 provided in the sensor magnet 1, and evenly covers the entire sensor magnet 1. At this time, the tapered portion 4 of the sensor magnet 1 is pushed up by a rising volume of the resin 11, thereby causing the sensor magnet 1 to float up. Then, the sensor magnet 1 moves in a direction away from the rotor core 12 while positional relationship with the rotor core 12 is maintained by the pins 2 inserted into the sensor magnet insertion holes 6b, and is stopped by abutting against a top inside surface of the mold.

Subsequently, the filling of the resin 11 is completed, and the resin 11 is cured. This method provides the rotor 10 shown in FIG. 1, with the rotor core 12 and the sensor magnet 1 being firmly fixed and integrated with each other. As the rotor core 12 and the sensor magnet 1 are molded integrally by the resin 11 as described, the rotor core 12 and the sensor magnet 1 are easily mounted, increases in the number of parts needed for fixing can be reduced, and the sensor magnet 1 is less likely to be broken when the sensor magnet 1 is mounted.

Figure 10:
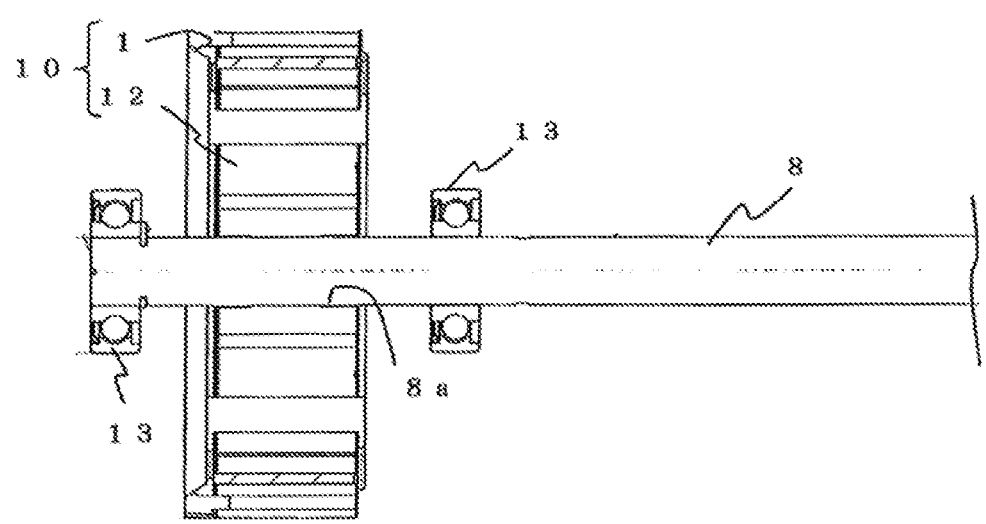
FIG. 10 is an explanatory diagram schematically showing a mounting structure of the rotor.
Figure 11:
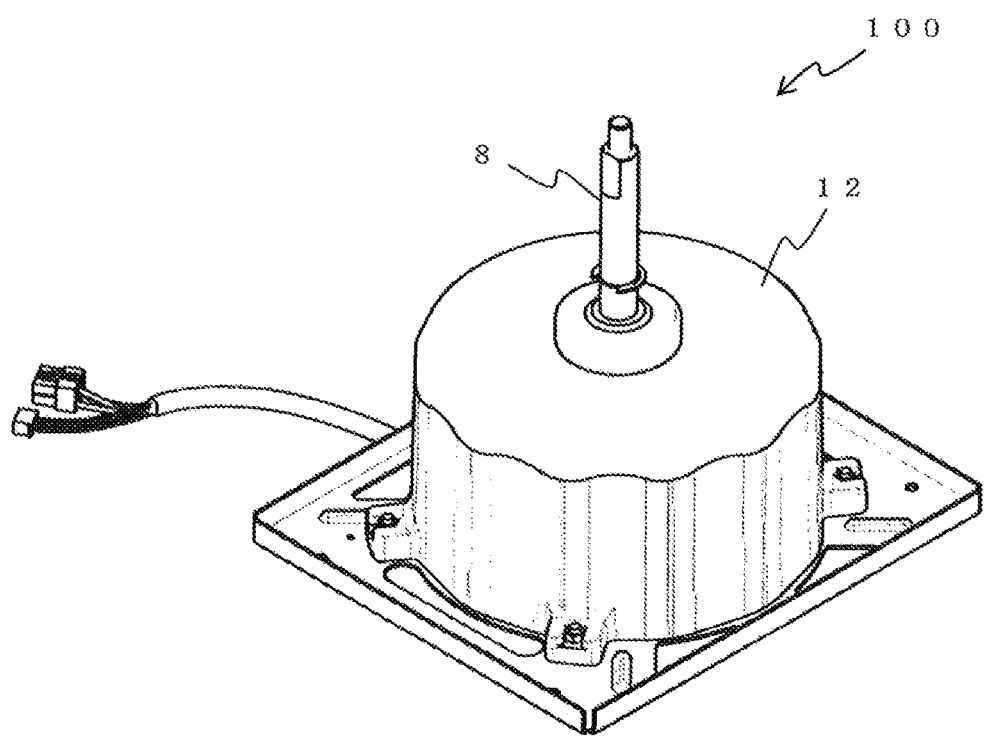
FIG. 11 is a perspective view of a rotary electric machine in which the rotor is used.

FIG. 10 is an explanatory diagram schematically showing a mounting structure of the rotor 10. Also, FIG. 11 is a perspective view of a rotary electric machine 100 in which the rotor 10 is used. As shown in FIGS. 10 and 11, the rotary electric machine 100 includes the rotor 10, a shaft 8 passed through the shaft insertion hole 8a of the rotor 10, and bearings 13 configured to support the shaft 8. When the rotor 10 operates, a rotary motion is transmitted to an external device connected via the shaft 8. The rotor 10 is consisted of the rotor core 12 and the sensor magnet 1 molded integrally by the resin 11, the rotor core 12 configured to rotationally operate, and the sensor magnet 1 configured to detect the rotational position of the rotor core 12. Use of the integrally molded rotor 10 allows rotational operation of the rotor 10 without displacement between the rotor core 12 and the sensor magnet 1.

Note that whereas in the example described above, the rotor core 12 is consisted of the outer ring 5 and the inner ring 7, the rotor core 12 may have a structure consisted of a single part into which the outer ring 5 and the inner ring 7 have been integrated. Also, a distance between the sensor magnet 1 and the rotor core 12 may be adjusted using a height position adjustment pin or a similar portion provided on an inner surface of the mold.

In the rotor 10 according to the present invention described above, the pins 2 are formed on the sensor magnet 1, and the sensor magnet 1 and the rotor core 12 are fixed to each other by the single-piece mold while the positional relationship between the sensor magnet 1 and the rotor core 12 is maintained by the pins 2 inserted into the rotor core 12. This method eliminates the need to mount the sensor magnet 1 and the rotor core 12 separately or to fix the sensor magnet 1 and the rotor core 12 by a mechanical fixture, and thereby reduces the possibility of breakage of the rotor 10.

The cuts 3 formed in the sensor magnet 1 allow the resin 11 filling the mold to flow through the cuts 3, thoroughly covering the sensor magnet 1.

The tapered portion 4 is formed on an edge portion of the surface of the sensor magnet 1 on which the protrusions are formed, and consequently, when the resin 11 is filled into the mold, the sensor magnet 1 is pushed up and caused to float up. Consequently, the distance between the sensor magnet 1 and the rotor core 12 is kept constant.

The tapered portion 4 may be provided on an inner peripheral edge portion of the sensor magnet 1.

The tapered portion 4 may also be provided on an outer peripheral edge portion of the sensor magnet 1.

As the rotor core 12 is formed of the outer ring 5 and the inner ring 7 placed coaxially on an inner side of the outer ring 5, electrolytic corrosion of the rotor 10 can be inhibited.

The rotary electric machine 100 in which the rotor core 12 and the sensor magnet 1 are molded integrally does not wobble during operation, and thus noise during operation can be reduced.

In the production process of the rotor 10, the resin 11 is filled into the mold with the pins 2 of the sensor magnet 1 inserted into the sensor magnet insertion holes 6b, and the sensor magnet 1 and the rotor core 12 are firmly fixed to each other. At this time, as the volume of the resin 11 increases, the sensor magnet 1 floats up to the top inside surface of the mold and then is firmly fixed. This method can easily obtain the rotor 10 in which the distance between the sensor magnet 1 and the rotor core 12 is constant. Also, as the sensor magnet 1 and the rotor core 12 are molded integrally, the need to mount the sensor magnet 1 and the rotor core 12 separately as well as the need for parts for mounting the sensor magnet 1 and the rotor core 12 can be eliminated.

REFERENCE SIGNS LIST 1 sensor magnet 2 pin 3 cut 4 tapered portion 5 outer ring 5a, 7a concavo-convex portion 5b, 7b engaging portion 5c space 6a main magnet insertion hole 6b sensor magnet insertion hole 7 inner ring
8 shaft 8a shaft insertion hole 9 main magnet 10 rotor 11 resin 12 rotor core 13 bearing 100 rotary electric machine

The invention claimed is:

1. A rotor comprising:
a rotor core having a cylindrical shape and a plurality of insertion holes; and
a sensor magnet having an annular shape and placed coaxially with the rotor core,
the sensor magnet having a surface, the sensor magnet having a plurality of protrusions protruding toward the rotor core and a plurality of cuts formed on the surface on which the plurality of protrusions are provided, the sensor magnet having an other surface opposite to the surface on which the protrusions are provided,
the plurality of protrusions being inserted into the plurality of insertion holes,
the rotor core and the sensor magnet being firmly fixed to each other by resin,
the sensor magnet further having a tapered portion provided on an outer peripheral edge portion of the sensor magnet,
the tapered portion facing the rotor core, and
the tapered portion having an inside diameter that is enlarged from the surface on which the plurality of protrusions are provided towards the other surface opposite to the surface on which the protrusions are provided.

2. The rotor of claim 1, wherein the rotor core is constituted of an outer ring and an inner ring placed coaxially with the outer ring.

3. A rotary electric machine comprising the rotor of claim 1.

4. The rotary electric machine of claim 3, wherein the rotor core is constituted of an outer ring and an inner ring placed coaxially with the outer ring.

5. A method of producing a rotor, the method comprising:
placing a rotor core and a sensor magnet coaxially with each other, the rotor core having a cylindrical shape and a plurality of insertion holes, the sensor magnet having a surface, the sensor magnet having an annular shape, a plurality of protrusions protruding from the surface, a plurality of cuts formed on a surface on which the plurality of protrusions are provided, the sensor magnet having an other surface opposite to the surface on which the protrusions are provided;
inserting the plurality of protrusions into the plurality of insertion holes to position the rotor core and the sensor magnet; and
integrally molding, by resin, the rotor core and the sensor magnet that are positioned, wherein the sensor magnet has a tapered portion provided on an outer peripheral edge portion of the sensor magnet, the tapered portion facing the rotor core, and the tapered portion having an inside diameter that is enlarged from the surface on which the plurality of protrusions are provided towards the other surface opposite to the surface on which the protrusions are provided.

6. The method of claim 5, wherein the rotor core is constituted of an outer ring and an inner ring placed coaxially with the outer ring.

* * * * *